(12) United States Patent
Rowe

(10) Patent No.: US 12,403,836 B2
(45) Date of Patent: Sep. 2, 2025

(54) STORAGE COMPARTMENT ASSEMBLIES HAVING ARTIFICIAL MUSCLES AND METHODS OF OPERATING STORAGE COMPARTMENT ASSEMBLIES

(71) Applicant: Toyota Motor Engineering & Manufacturing North America, Inc., Plano, TX (US)

(72) Inventor: Michael P. Rowe, Pinckney, MI (US)

(73) Assignee: TOYOTA MOTOR ENGINEERING & MANUFACTURING NORTH AMERICA, INC., Pl.ano, TX (US)

( * ) Notice: Subject to any disclaimer, the term of this patent is extended or adjusted under 35 U.S.C. 154(b) by 805 days.

(21) Appl. No.: 17/685,927

(22) Filed: Mar. 3, 2022

(65) Prior Publication Data
US 2023/0115462 A1     Apr. 13, 2023

Related U.S. Application Data
(60) Provisional application No. 63/253,361, filed on Oct. 7, 2021.

(51) Int. Cl.
*B60R 7/04* (2006.01)
*B60P 7/06* (2006.01)

(52) U.S. Cl.
CPC .............. *B60R 7/04* (2013.01); *B60P 7/065* (2013.01)

(58) Field of Classification Search
CPC .......... B60R 7/04; B60P 7/065; B65D 81/022; B65D 81/09; B65D 81/052; F15B 21/065
USPC ........................................ 206/521, 522, 591
See application file for complete search history.

(56) References Cited

U.S. PATENT DOCUMENTS

| | | | | |
|---|---|---|---|---|
| 2,834,606 A | * | 5/1958 | Bertrand | B60R 21/20 D12/400 |
| 4,762,231 A | * | 8/1988 | Kiselewski | A45C 13/021 206/522 |
| 5,624,035 A | * | 4/1997 | Kim | B65D 81/052 206/592 |
| 6,581,760 B1 | | 6/2003 | Robertson | |
| 11,339,805 B2 | * | 5/2022 | Rowe | F15B 21/065 |
| 11,773,878 B1 | * | 10/2023 | Rowe | B32B 5/022 92/93 |
| 2007/0119861 A1 | | 5/2007 | Bhagwat | |

(Continued)

FOREIGN PATENT DOCUMENTS

JP      2019098122 A      6/2019

*Primary Examiner* — Chun Hoi Cheung
(74) *Attorney, Agent, or Firm* — Dinsmore & Shohl LLP

(57) ABSTRACT

A storage compartment assembly including a storage compartment having at least one inside surface and defining an opening for receiving an object, one or more artificial muscles disposed within the storage compartment along the inside surface. Each artificial muscle includes a housing having an electrode region and an expandable fluid region, a dielectric fluid housed within the housing, and an electrode pair positioned in the electrode region of the housing. The electrode pair includes a first electrode and a second electrode. The electrode pair is configured to actuate between a non-actuated position and an actuated position such that actuation from the non-actuated position to the actuated position directs the dielectric fluid into the expandable fluid region to expand the expandable fluid region into the storage compartment.

20 Claims, 7 Drawing Sheets

(56) References Cited

U.S. PATENT DOCUMENTS

| | | | |
|---|---|---|---|
| 2011/0079533 A1* | 4/2011 | Kasiwabara | B65D 81/051 |
| | | | 53/461 |
| 2011/0272299 A1 | 11/2011 | Smith | |
| 2012/0183437 A1 | 7/2012 | Keener et al. | |
| 2014/0224699 A1* | 8/2014 | Smith | B65D 81/052 |
| | | | 206/522 |
| 2015/0089976 A1 | 4/2015 | Alulis et al. | |
| 2017/0238569 A1 | 8/2017 | Adam | |
| 2017/0320650 A1* | 11/2017 | Aguilar | B65D 81/03 |
| 2018/0002094 A1 | 1/2018 | McCollum | |
| 2020/0223505 A1* | 7/2020 | Santucci | B62J 9/23 |
| 2020/0290773 A1 | 9/2020 | Gannet et al. | |
| 2021/0370499 A1* | 12/2021 | Rowe | F03G 7/012 |
| 2023/0090955 A1* | 3/2023 | Endrizzi | F25D 3/06 |
| | | | 206/522 |

\* cited by examiner

STORAGE COMPARTMENT ASSEMBLIES HAVING ARTIFICIAL MUSCLES AND METHODS OF OPERATING STORAGE COMPARTMENT ASSEMBLIES

CROSS-REFERENCE TO RELATED APPLICATION

This application claims the benefit of U.S. Patent Application No. 63/253,361, filed Oct. 7, 2021, for "Compartment Comprising Artificial Muscles," which is hereby incorporated by reference in its entirety including the drawings.

TECHNICAL FIELD

The present specification generally relates to storage compartment assemblies and methods for operating storage compartment assemblies, and, more specifically, storage compartment assemblies having artificial muscles and methods for operating storage compartment assemblies having artificial muscles.

BACKGROUND

Traditional storage compartments in vehicles are capable of storing small objects, such as sunglasses, keys, and the like. However, these small objects can move around in the storage compartment, causing noise and damage to the object. Additionally, movement of the vehicle may result in the objects being unintentionally removed from the storage compartment. Accordingly, a need exists for storage compartment assemblies with mechanisms for retaining small objects while a vehicle is in motion.

SUMMARY

In one embodiment, a storage compartment assembly includes a storage compartment having at least one inside surface and defining an opening for receiving an object, one or more artificial muscles disposed within the storage compartment along the inside surface. Each artificial muscle includes a housing having an electrode region and an expandable fluid region, a dielectric fluid housed within the housing, and an electrode pair positioned in the electrode region of the housing. The electrode pair includes a first electrode and a second electrode. The electrode pair is configured to actuate between a non-actuated position and an actuated position such that actuation from the non-actuated position to the actuated position directs the dielectric fluid into the expandable fluid region to expand the expandable fluid region into the storage compartment.

In another embodiment, a storage compartment assembly includes a storage compartment having at least one inside surface and defining an opening for receiving an object, and a compartment portal extending over the opening. The compartment portal includes a plurality of artificial muscle cantilevers. Each artificial muscle cantilever includes a housing with an electrode region fluidly coupled to a cantilevered region, the cantilevered region having at least one expandable fluid chamber, a first electrode and a second electrode each disposed in the electrode region of the housing, and a bladder housing a fluid and extending into the cantilevered region. The cantilevered region of the housing of each of the plurality of artificial muscle cantilevers extends over the opening.

In yet another embodiment, a method of operating a storage compartment assembly, the method includes actuating a plurality of artificial muscle cantilevers of a compartment portal, and actuating one or more artificial muscles disposed within the storage compartment. Each artificial muscle cantilever includes a housing with an electrode region fluidly coupled to a cantilevered region, the cantilevered region having at least one expandable fluid chamber, a first electrode and a second electrode each disposed in the electrode region of the housing, and a bladder housing a fluid and extending into the cantilevered region. The cantilevered region of the housing of each of the plurality of artificial muscle cantilevers extends over an opening for receiving an object, the opening defined by a storage compartment. The first electrode and the second electrode of the plurality of artificial muscle cantilevers are actuatable between a non-actuated position and an actuated position such that actuation from the non-actuated position to the actuated position directs the fluid in the bladder into the at least one expandable fluid chamber of the cantilevered region. Each artificial muscle includes a housing with an electrode region and an expandable fluid region, a dielectric fluid housed within the housing, and an electrode pair positioned in the electrode region of the housing. The electrode pair includes a first electrode and a second electrode. The electrode pair is configured to actuate between a non-actuated position and an actuated position such that actuation from the non-actuated position to the actuated position directs the dielectric fluid into the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to storage compartment assemblies including a storage compartment, a plurality of artificial muscles positioned within the storage compartment, and a compartment portal positioned across an opening of the storage compartment. The artificial muscles are configured to expand within the storage compartment to contact and retain an object positioned within the storage compartment. The compartment portal includes a plurality of artificial muscle cantilevers that extend across the opening. The artificial muscle cantilevers may be actuated to stiffen the artificial muscle cantilevers, thereby restricting egress and ingress of an object within the storage compartment.

Figure 1:
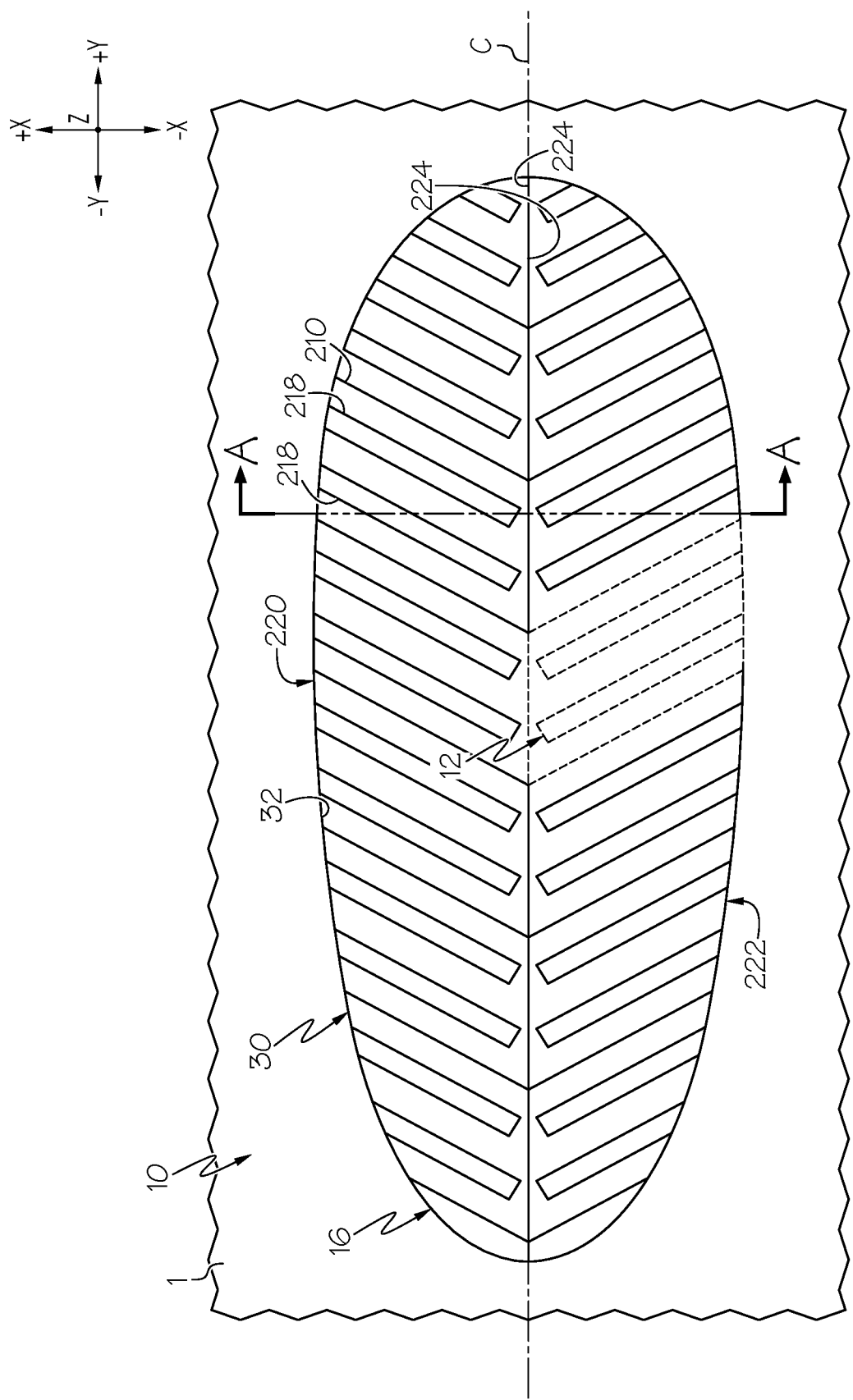
FIG. 1 schematically depicts a top view of a storage compartment assembly, according to one or more embodiments shown and described herein.

Referring now to FIG. 1, a storage compartment assembly 10 is depicted. The storage compartment assembly 10 includes a storage compartment 12, a plurality of artificial muscles 14 (FIG. 2) disposed within the storage compartment 12, and a compartment portal 16. The storage compartment 12 may be formed in a surface 1 of a vehicle, such that the storage compartment 12 may extend into one of a dashboard, an overhead console, or a panel of the vehicle. In embodiments, the storage compartment 12 may be formed in a surface external to a vehicle, such as a building or other structure. As depicted in FIG. 1, the opening 24 may be shaped as an oval. However, the opening 24 may have any shape operable to act as an opening for the storage compartment 12, such as square, rectangular, circular, or the like.

Figure 2:
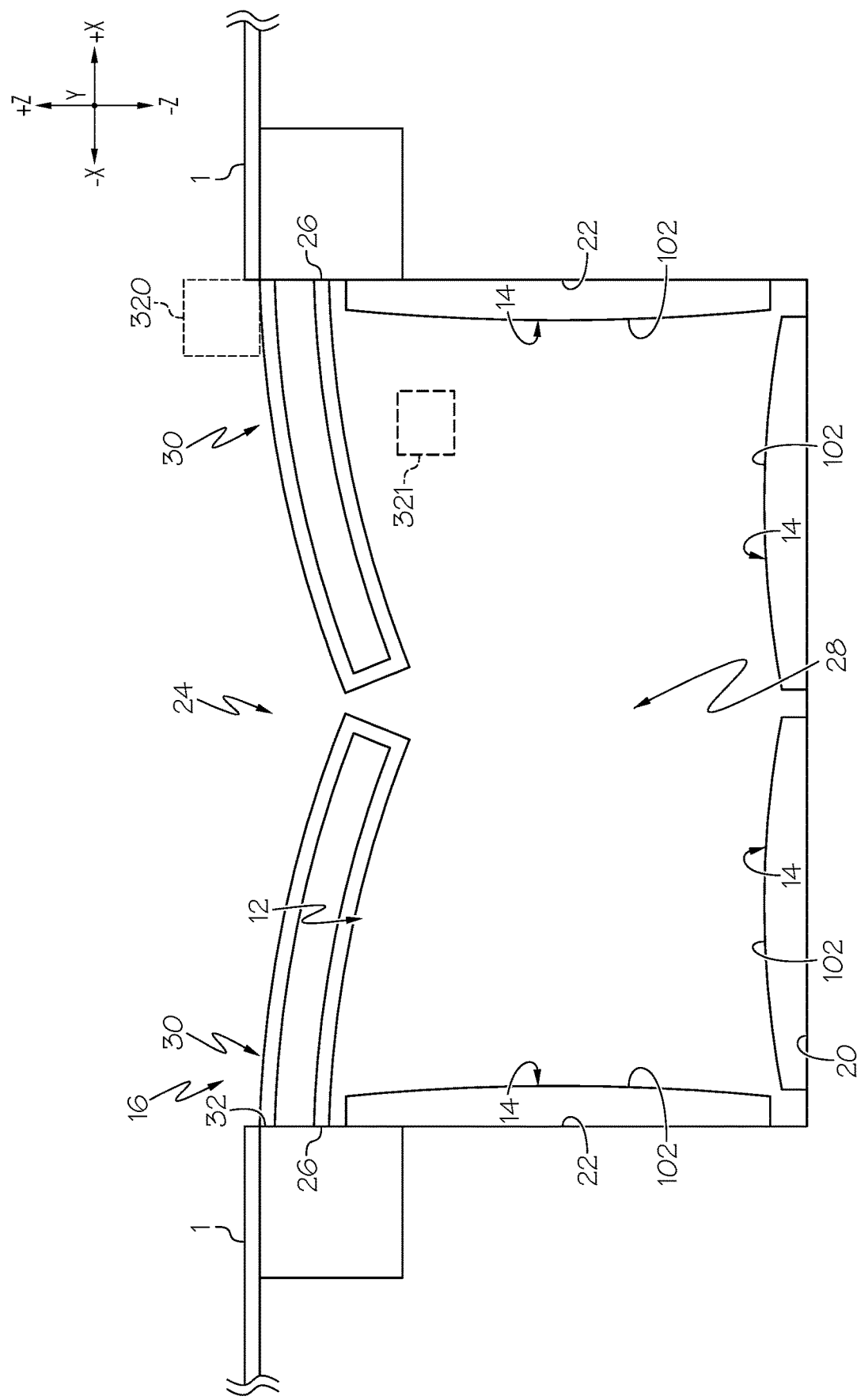
FIG. 2 schematically depicts a cross-sectional side view of the storage compartment assembly of FIG. 1 taken along lines A-A with the storage compartment assembly in a non-actuated state, according to one or more embodiments shown and described herein.
Figure 3:
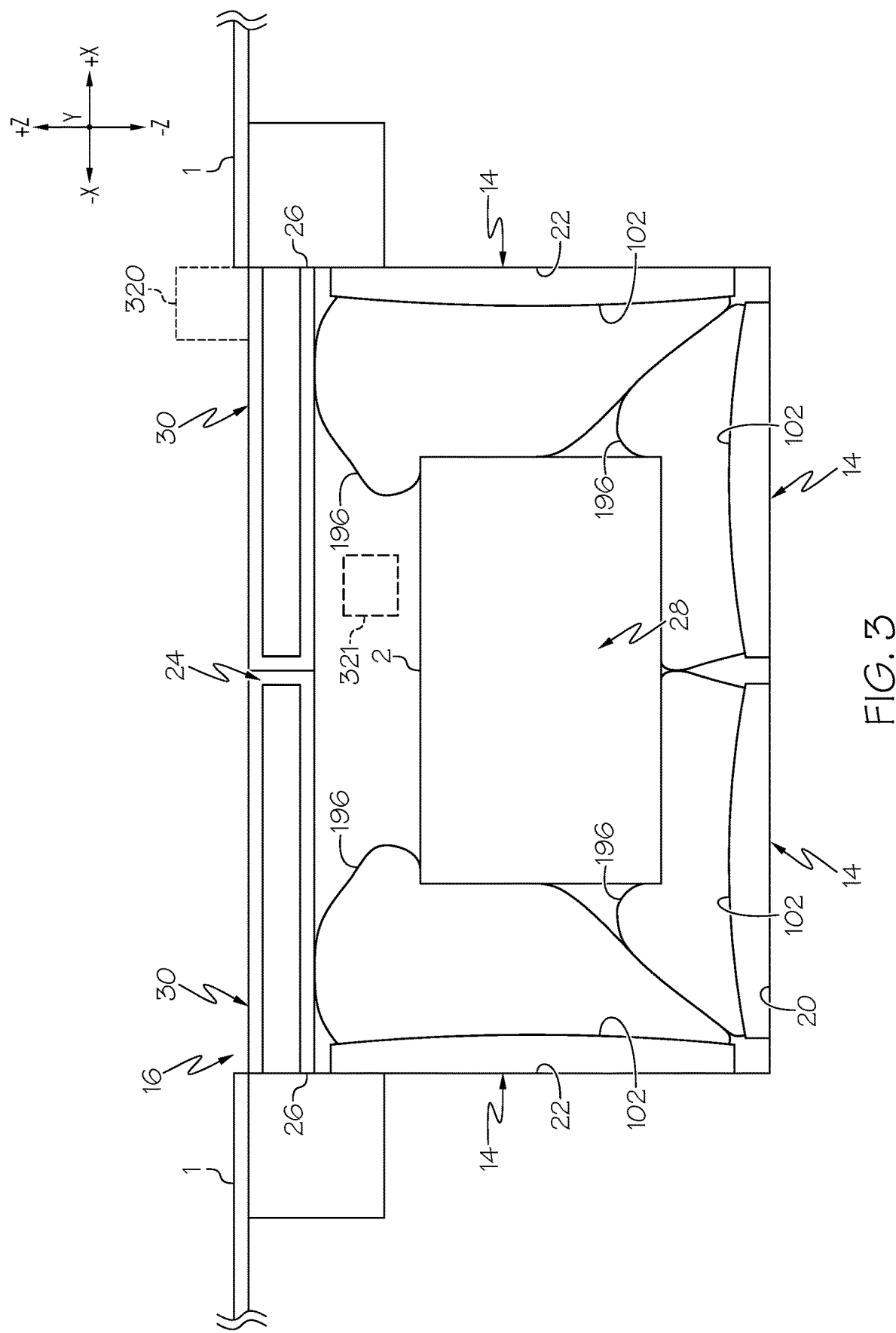
FIG. 3 schematically depicts a cross-sectional side view of the storage compartment assembly of FIG. 1 taken along lines A-A with the storage compartment assembly in an actuated state, according to one or more embodiments shown and described herein.

Referring to FIGS. 2 and 3, the storage compartment 12 may include a plurality of inside surfaces, including an end surface 20 and one or more sidewalls 22 extending from the end surface 20, and an opening 24 defined by upper portions 26 of the sidewalls 22 of the storage compartment 12. The artificial muscles 14 may be disposed within the storage compartment 12 along the sidewalls 22 and the end surface 20. The compartment portal 16 may extend across the opening 24 of the storage compartment 12.

The artificial muscles 14 may be actuated between a non-actuated position and an actuated position. When moving from the non-actuated position to the actuated position, the artificial muscles 14 may expand toward a center 28 of the storage compartment 12. The center 28 of the storage compartment 12 may be a central portion of the storage compartment 12 in a vertical direction (e.g., in the +/−Z direction), a longitudinal direction (e.g., in the +/−Y direction), a lateral direction (e.g., in the +/−X direction), or any combination thereof.

The compartment portal 16 may include a plurality of artificial muscle cantilevers 30 that extend across the opening 24 of the storage compartment 12. The artificial muscle cantilevers 30 may be actuated between an actuated position and a non-actuated position. In the actuated position, a stiffness of the artificial muscle cantilevers 30 is increased, as compared to a stiffness of the artificial muscle cantilevers 30 when in the non-actuated position, to prevent egress and ingress of objects into and out of the storage compartment 12 through the opening 24. Accordingly, when in the non-actuated position, the stiffness of the artificial muscle cantilevers 30 decreases such that the artificial muscle cantilevers 30 may be deformable and flexible to allow access to the storage compartment 12 through the opening 24.

The storage compartment 12 may be configured to receive an object 2 (FIG. 3). The storage compartment assembly 10 may be configured to retain the object 2 within the storage compartment 12. The storage compartment assembly 10 may be movable between a non-actuated state (FIG. 2) and an actuated state (FIG. 3).

Referring to FIG. 2, in the non-actuated state, the artificial muscles 14 are in the non-actuated position, and the artificial muscle cantilevers 30 are in the non-actuated position. In the non-actuated state, the object 2 is permitted to pass through the compartment portal 16 to be inserted into or removed from the storage compartment 12.

Referring to FIG. 3, in the actuated state, the artificial muscles 14 are in the actuated position, and the artificial muscle cantilevers 30 are in the actuated position. In the actuated state, the artificial muscle cantilevers 30 may restrict the object 2 from passing through the compartment portal 16. In the actuated state, the artificial muscles 14 may expand to contact and deform around the object 2 positioned within the storage compartment 12. The contact between the artificial muscles 14 and the object 2 maintains the position of the object 2 within the storage compartment 12.

Figure 4:
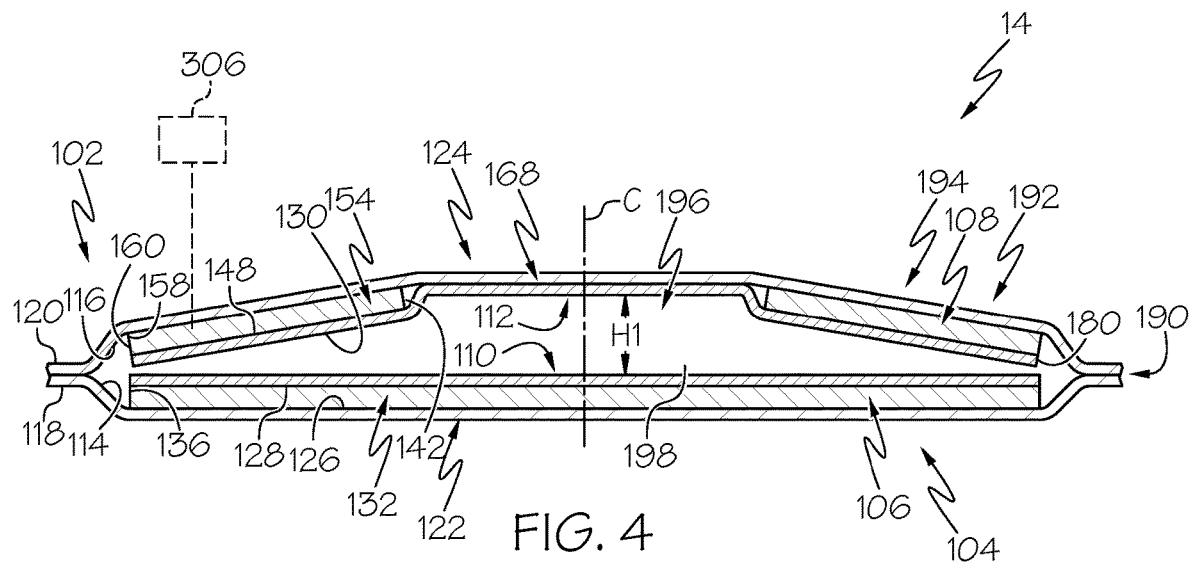
FIG. 4 schematically depicts a cross-sectional side view of an artificial muscle of the storage compartment assembly of FIG. 1 with the artificial muscle in a non-actuated position, according to one or more embodiments shown and described herein.
Figure 5:
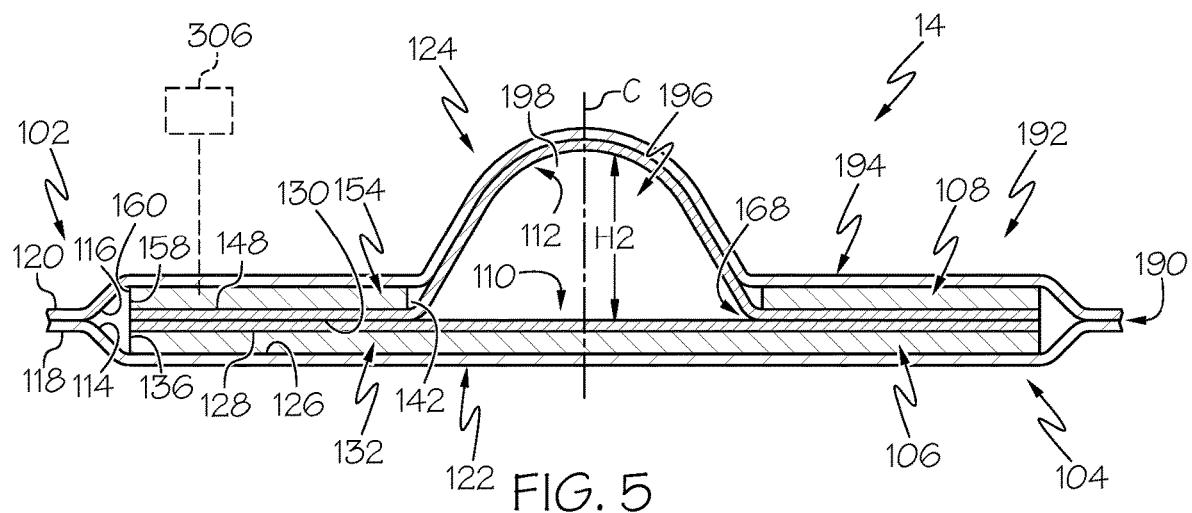
FIG. 5 schematically depicts a cross-sectional side view of the artificial muscle of FIG. 4 with the artificial muscle in an actuated position, according to one or more embodiments shown and described herein.

Referring now to FIGS. 4 and 5, an embodiment of the artificial muscle 14 is depicted in more detail. Specifically, the artificial muscle 14 may include a housing 102, an electrode pair 104, including a first electrode 106 and a second electrode 108, fixed to opposite surfaces of the housing 102, a first electrical insulator layer 110 fixed to the first electrode 106, and a second electrical insulator layer 112 fixed to the second electrode 108. In some embodiments, the artificial muscle 14 may include only a single electrical insulator layer fixed to one of the first electrode 106 and the second electrode 108 leaving the other of the first electrode 106 and the second electrode 108 non-electrically insulated. In some embodiments, the housing 102 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 102 are heat-sealable. In other embodiments, the housing 102 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

Throughout the ensuing description, reference may be made to the housing 102 including the first film layer 122 and the second film layer 124, as opposed to the one-piece housing. It should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene (BOPP).

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 14 is negatively charged. In embodiments in which only one of the first electrode 106 and the second electrode 108 is insulated by an electrically insulated layer, such as the first electrical insulator layer 110 or the second electrical insulator layer 112, the insulated layer is the positively charged electrode and the non-insulated layer is the negatively charged electrode.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal extending from the first electrode 106 past an edge of the first film layer 122 such that the first terminal can be connected to a power supply to actuate the first electrode 106. Specifically, the first terminal is coupled, either directly or in series, to a power supply and a controller of an control system 300. Similarly, the second electrode 108 has a film-facing surface 148 and an opposite inner surface 130. The second electrode 108 is positioned against the second film layer 124, specifically, the second inner surface 116 of the second film layer 124. The second electrode 108 includes a second terminal extending from the second electrode 108 past an edge of the second film layer 124 such that the second terminal can be connected to a power supply and a controller of the control system 300 to actuate the second electrode 108.

With respect now to the first electrode 106, in embodiments, the first electrode 106 includes two or more fan portions 132 extending radially from a center axis C of the artificial muscle 14. In some embodiments, the first electrode 106 includes only two fan portions 132 positioned on opposite sides or ends of the first electrode 106. In some embodiments, the first electrode 106 includes more than two fan portions 132, such as three, four, or five fan portions 132. In embodiments in which the first electrode 106 includes an even number of fan portions 132, the fan portions 132 may be arranged in two or more pairs of fan portions 132.

The second electrode 108 may similarly include two or more fan portions 154 extending radially from a center axis C of the artificial muscle 14. In some embodiments, the second electrode 108 includes only two fan portions 154 positioned on opposite sides or ends of the second electrode 108. In some embodiments, the second electrode 108 includes more than two fan portions 154, such as three, four, or five fan portions 154. In embodiments in which the second electrode 108 includes an even number of fan portions 154, the fan portions 154 may be arranged in two or more pairs of fan portions 154.

In embodiments, a central opening 168 is formed within the second electrode 108 between the fan portions 154, and is coaxial with the center axis C. Each fan portion 154 has a fan length extending from a perimeter 142 of the central opening 168 to the second end 160 of the fan portion 154. With reference to FIG. 3, the first electrode 106 may be positioned between the second electrode 108 and the sidewall 22 such that the central opening 168 in the second electrode 108 is directed toward the center 28 of the storage compartment 12. The expandable fluid region 196 may extend out of the opening 168 toward the center 28 of the storage compartment 12.

Referring back to FIGS. 4 and 5, the first electrode 106, the second electrode 108, the first electrical insulator layer 110, and the second electrical insulator layer 112 provide a barrier that prevents the first film layer 122 from sealing to the second film layer 124 forming an unsealed portion 192. The unsealed portion 192 of the housing 102 includes an electrode region 194, in which the electrode pair 104 is provided, and an expandable fluid region 196, which is surrounded by the electrode region 194. The central opening 168 of the second electrode 108 defines the expandable fluid region 196. Although not shown, the housing 102 may be cut to conform to the geometry of the electrode pair 104 and reduce the size of the artificial muscle 14, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 14 using a needle or other suitable injection device.

The expandable fluid region 196 of the artificial muscles 14 may be larger than that depicted in FIGS. 4 and 5. The artificial muscles 14 may include additional dielectric fluid 198 within the housing 102 and/or the first electrode 106 and the second electrode 108 may be displaced further during actuation of the artificial muscle 14 to displace additional fluid and further expand the expandable fluid region 196.

In embodiments, the first electrode 106 may include structure similar to the second electrode 108, with a central opening disposed opposite the central opening 168 of the second electrode 108. In such embodiments, the dielectric fluid 198 may extend out of the central opening in the first electrode 106 and the central opening 168 in the second electrode 108. In embodiments, the artificial muscles 14 may include an opening at an end of either of the first electrode 106 and the second electrode 108 such that the dielectric fluid extends out of a side of the artificial muscle 14.

In the non-actuated position, as shown in FIG. 4, the first electrode 106 and the second electrode 108 are spaced apart with the dielectric fluid 198 positioned therebetween in the electrode region 194. In the non-actuated position, the expandable fluid region 196 has a first height H1.

In the actuated position, as shown in FIG. 5, the first electrode 106 and the second electrode 108 are brought into contact with and oriented parallel to one another to force the dielectric fluid 198 into the expandable fluid region 196. This causes the dielectric fluid 198 to flow through the central opening 168 of the second electrode 108 and inflate the expandable fluid region 196.

When actuated, as shown in FIG. 5, the first electrode 106 and the second electrode 108 zipper toward one another from the second ends 136, 158 of the fan portions 132, 154 thereof, thereby pushing the dielectric fluid 198 into the expandable fluid region 196. As shown, when in the actuated position, the first electrode 106 and the second electrode 108 are parallel to one another. In the actuated position, the dielectric fluid 198 flows into the expandable fluid region 196 to inflate the expandable fluid region 196. As such, the first film layer 122 and the second film layer 124 expand in opposite directions. In the actuated position, the expandable fluid region 196 has a second height H2, which is greater than the first height H1 of the expandable fluid region 196 when in the non-actuated position. Although not shown, it should be noted that the electrode pair 104 may be partially actuated to a position between the non-actuated position and the actuated position. This would allow for partial inflation of the expandable fluid region 196 and adjustments when necessary.

The first electrode 106 and the second electrode 108 may be electrically connected to a first power supply 306. In order to move the first electrode 106 and the second electrode 108 toward one another, a voltage is applied by the first power supply 306. In some embodiments, a voltage of up to 10 kV may be provided from the first power supply 306 to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the second film layer 124 and the second electrical insulator layer 112 to deform in a first axial direction along the center axis C of the first electrode 106. Once the voltage being supplied to the first electrode 106 and the second electrode 108 is discontinued, the first electrode 106 and the second electrode 108 return to their initial, non-parallel position in the non-actuated position.

Figure 6:
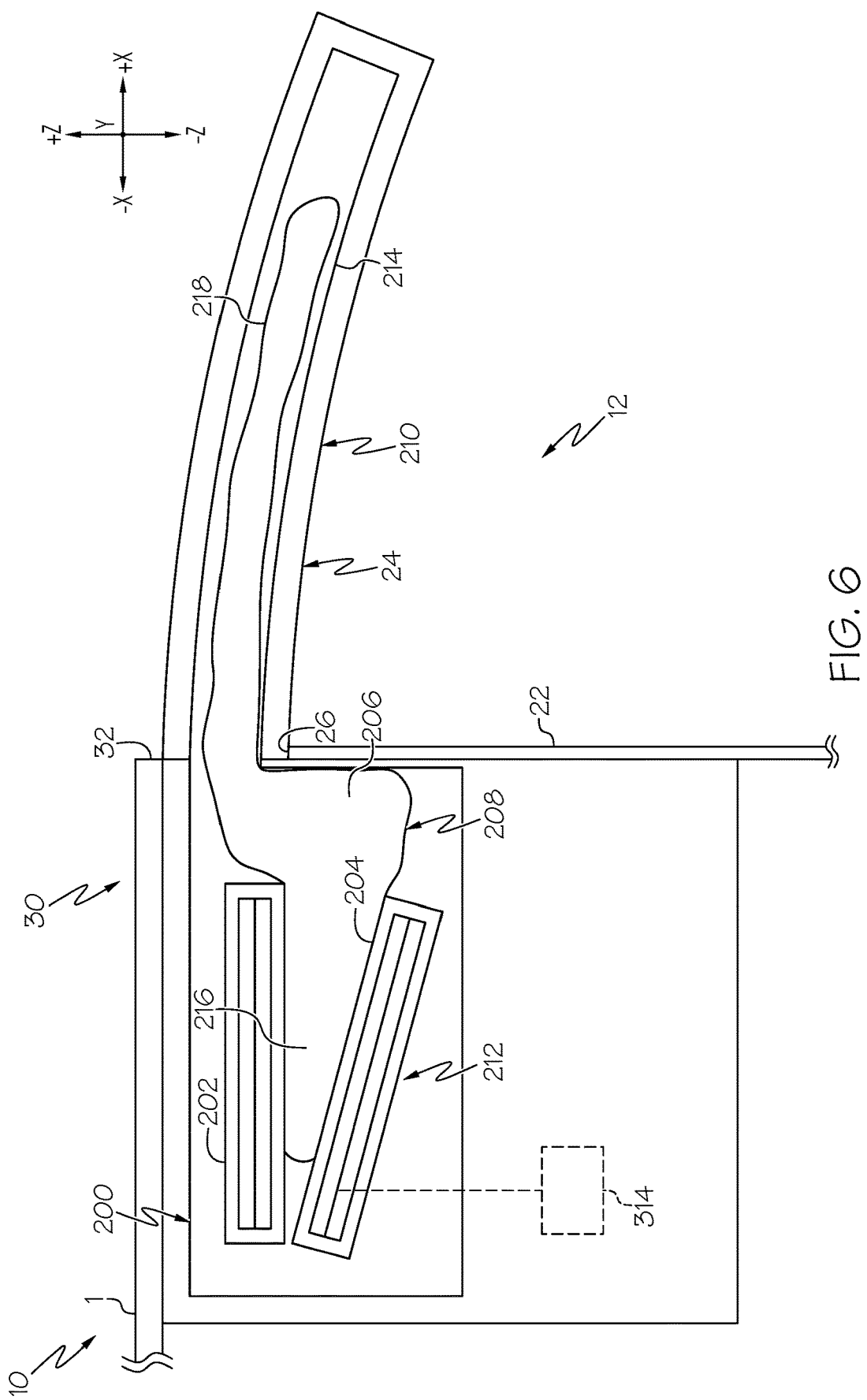
FIG. 6 schematically depicts a cross-sectional side view of an artificial muscle cantilever of the storage compartment assembly of FIG. 1 with the artificial muscle cantilever in a non-actuated position, according to one or more embodiments shown and described herein.
Figure 7:
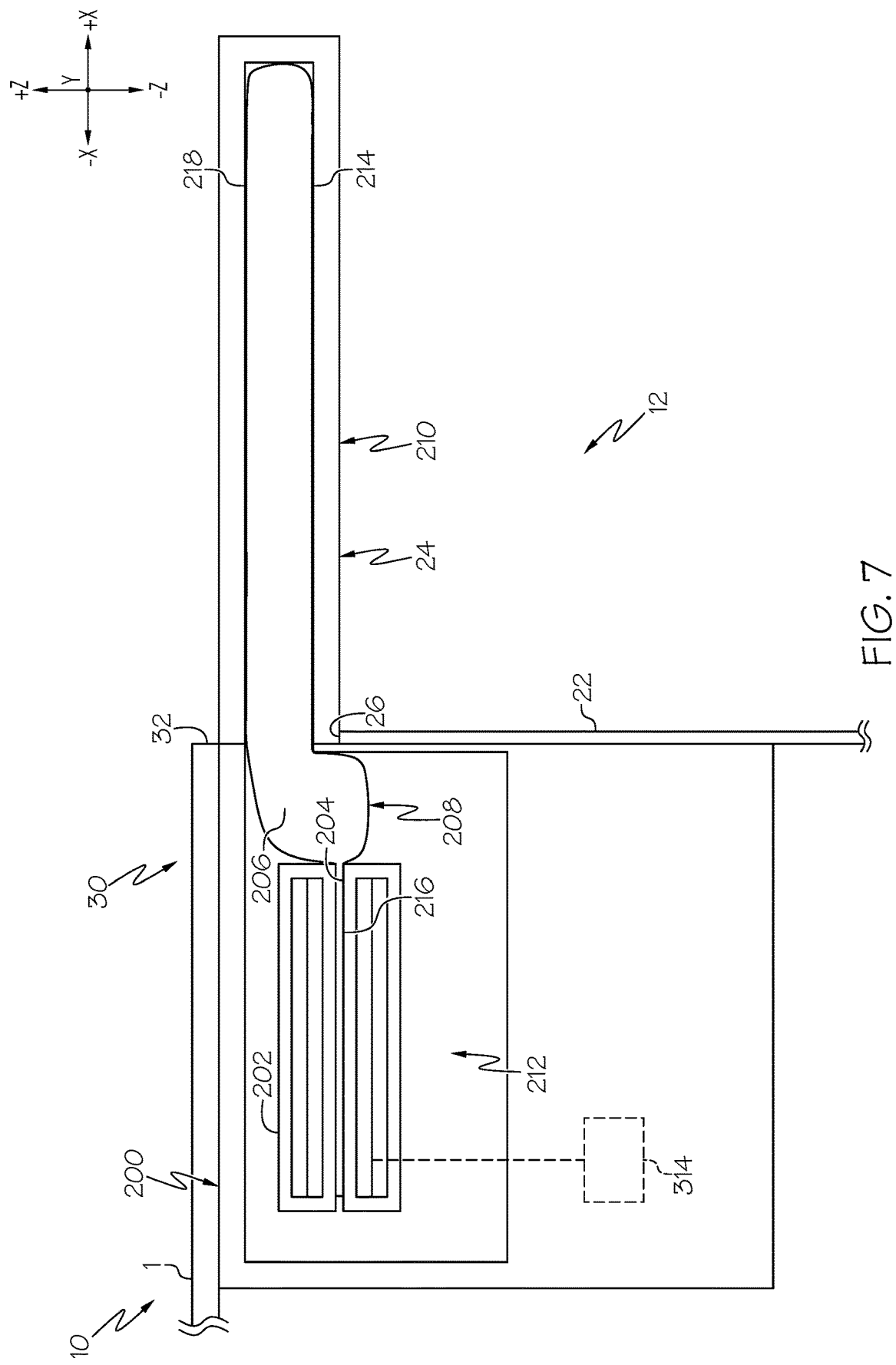
FIG. 7 schematically depicts a cross-sectional side view of the artificial muscle cantilever of FIG. 6 with the artificial muscle cantilever in an actuated position, according to one or more embodiments shown and described herein.

Referring to FIGS. 6 and 7, each artificial muscle cantilever 30 may include similar structure to that of the artificial muscles 14. Each artificial muscle cantilever 30 may include a housing 200, an electrode pair including a first electrode 202 and a second electrode 204, a fluid 206 housed within the housing 200, and a bladder 208. The housing 200 may include a cantilevered region 210 and an electrode region 212 fluidly coupled to the cantilevered region 210. The first electrode 202 and the second electrode 204 may be disposed within the electrode region 212 of the housing 200. The electrode region 212 of each of the plurality of artificial muscle cantilevers 30 may be disposed at a periphery 32 of the opening 24 of the storage compartment 12. The first electrode 202 and the second electrode 204 may include similar structure to that of the electrodes 106, 108 of the artificial muscles 14, and such like structure will not be described again for brevity. The first electrode 202 and the second electrode 204 may be movably attached to the housing 200 to allow the first electrode 202 and the second electrode 204 to move between the non-actuated position to the actuated position.

Each of the first electrode 202 and the second electrode 204 may be electrically connected to a second power supply 314. The second power supply 314 may send a current or voltage to the electrodes 202, 204 to move the electrodes 202, 204 from the non-actuated position to the actuated position.

The cantilevered region 210 may have at least one expandable fluid chamber 214. The cantilevered region 210 may include a plurality of expandable fluid chambers 214, such as two, that are each in fluid communication with each other. The bladder 208 may be positioned within the housing 200, and extend from the electrode region 212 into the expandable fluid chamber 214. The bladder 208 may enclose the fluid 206. The fluid 206 may be, for example, a dielectric fluid, an incompressible fluid, a liquid, a gas, or the like. The bladder 208 may include a compressible portion 216 positioned between the first electrode 202 and the second electrode 204, and an expandable portion 218 extending into the expandable fluid chamber 214. In embodiments, the artificial muscle cantilevers 30 may not include a bladder 208, such that the electrodes 202, 204 displace the fluid 206 throughout the expandable fluid chamber 214. The cantilevered region 210 of the housing 200 of each of the plurality of artificial muscle cantilevers 30 may extend over the opening 24.

Referring to FIG. 6, in the non-actuated position, the first electrode 202 and the second electrode 204 may be spaced apart, with the compressible portion 216 of the bladder 208 positioned between the first electrode 202 and the second electrode 204. Referring to FIG. 7, when the artificial muscle cantilevers 30 are actuated, the first electrode 202 and the second electrode 204 may be brought together to compress the compressible portion 216 of the bladder 208 to direct the fluid in the bladder 208 into the expandable portion 218. When the compressible portion 216 is compressed, the fluid in the compressible portion 216 may extend into the expandable portion 218. When the fluid is directed into the expandable portion 218, the expandable portion 218 expands in the expandable fluid chamber 214 of the cantilevered region 210, expanding the expandable fluid chamber 214 and increasing a stiffness of the cantilevered region 210 of the housing 200.

Referring again to FIG. 1, adjacent pairs of the plurality of artificial muscle cantilevers 30 are coupled together along their cantilevered regions 210. The plurality of artificial muscle cantilevers 30 may include a first set 220 and a second set 222. The first set 220 may include cantilevered regions 210 extending over a first region of the opening 24 and the second set 222 may include cantilevered regions 210 extending over a second region of the opening 24. Ends 224 of the cantilevered regions 210 of the first set 220 of artificial muscle cantilevers 30 may be disposed to face ends 224 of the cantilevered regions 210 of the second set 222 of artificial muscle cantilevers at a location over the opening 24. The contact between the ends 224 of the cantilevered regions 210 of the first set 220 of artificial muscle cantilevers 30 and the ends 224 of the cantilevered regions 210 of the second set 222 of artificial muscle cantilevers 30 may define a central axis C extending across the compartment portal 16. Each of the cantilevered regions 210 of the first set 220 of artificial muscle cantilevers 30 and the cantilevered regions 210 of the second set 222 of artificial muscle cantilevers 30 may be angled obliquely from the central axis C.

Figure 8:
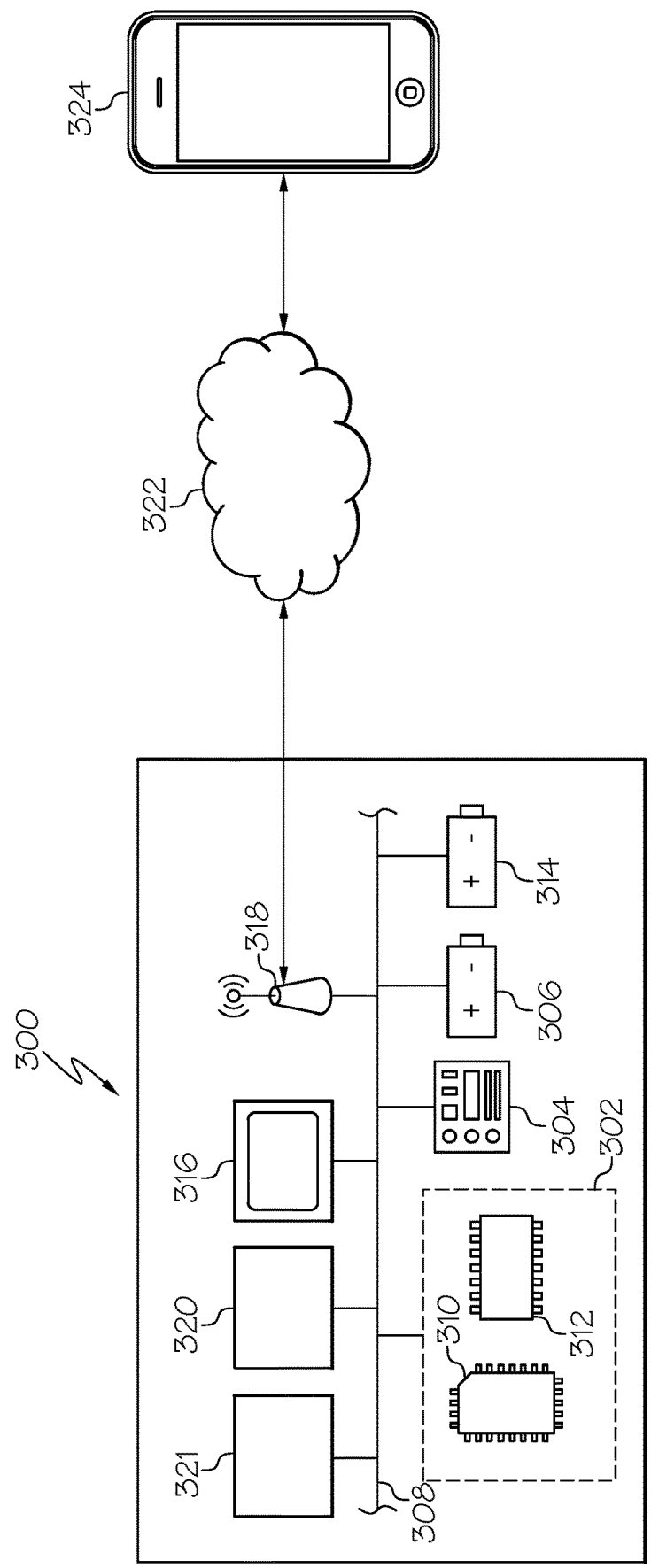
FIG. 8 schematically depicts a control system for operating the storage compartment assembly of FIG. 1, according to one or more embodiments shown and described herein.

Referring to FIG. 8, the storage compartment 12 may further include a control system 300. The control system 300 may include a controller 302, a first proximity sensor 320, a second proximity sensor 321, an operating device 304, a first power supply 306, a second power supply 314, and a communication path 308. The first proximity sensor 320 may be configured to detect a proximity of an object approaching the compartment portal 16. The object, for example, may be a hand of a user. In response to receiving a signal from the first proximity sensor 320 indicative of the proximity of the object near the compartment portal 16, the controller 302 may be configured to determine whether the detected proximity is within a predetermined proximity of the compartment portal 16 and, in response, actuate the artificial muscle cantilevers 30 to the non-actuated position. The predetermined proximity may be, for example, less than one inch, one inch, two inches, three inches, or more than three inches. The first proximity sensor 320 may be any sensor capable of detecting an object around the first proximity sensor 320, such as, for example, a through-beam sensor, an inductive sensor, a force sensor, or the like.

The second proximity sensor 321 may be positioned within the storage compartment 12. The second proximity sensor 321 may be configured to detect the object 2 within the storage compartment 12. In response to receiving a signal from the second proximity sensor 321 indicative of the object 2 being positioned within the storage compartment 12, the controller 302 may be configured to actuate the artificial muscles 14 to the actuated position. When the second proximity sensor 321 does not detect the object 2 in the storage compartment 12, the controller 302 may be configured to actuate the artificial muscles 14 to the non-actuated position. The second proximity sensor 321 may be any sensor capable of detecting an object around the second proximity sensor 321, such as, for example, a through-beam sensor, an inductive sensor, a force sensor, or the like.

The controller 302 includes a processor 310 and a non-transitory electronic memory 312 to which various components are communicatively coupled. In some embodiments, the processor 310 and the non-transitory electronic memory 312 and/or the other components are included within a single device. In other embodiments, the processor 310 and the non-transitory electronic memory 312 and/or the other components may be distributed among multiple devices that are communicatively coupled. The controller 302 includes non-transitory electronic memory 312 that stores a set of machine-readable instructions. The processor 310 executes the machine-readable instructions stored in the non-transitory electronic memory 312. The non-transitory electronic memory 312 may comprise RAM, ROM, flash memories, hard drives, or any device capable of storing machine-readable instructions such that the machine-readable instructions can be accessed by the processor 310. Accordingly, the control system 300 described herein may be implemented in any conventional computer programming language, as pre-programmed hardware elements, or as a combination of hardware and software components. The non-transitory electronic memory 312 may be implemented as one memory module or a plurality of memory modules.

In some embodiments, the non-transitory electronic memory 312 includes instructions for executing the functions of the control system 300. The instructions may include instructions for operating the artificial muscles 14 and the artificial muscle cantilevers 30 based on a user command.

The processor 310 may be any device capable of executing machine-readable instructions. For example, the processor 310 may be an integrated circuit, a microchip, a computer, or any other computing device. The non-transitory electronic memory 312 and the processor 310 are coupled to the communication path 308 that provides signal interconnectivity between various components and/or modules of the control system 300. Accordingly, the communication path 308 may communicatively couple any number of processors with one another, and allow the modules coupled to the communication path 308 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 8, the communication path 308 communicatively couples the processor 310 and the non-transitory electronic memory 312 of the controller 302 with a plurality of other components of the control system 300. For example, the control system 300 depicted in FIG. 8 includes the processor 310 and the non-transitory electronic memory 312 communicatively coupled with the operating device 304, the first power supply 306, the second power supply 314, the first proximity sensor 320, and the second proximity sensor 321.

The operating device 304 allows for a user to control operation of the artificial muscles 14 and the artificial muscle cantilevers 30. In some embodiments, the operating device 304 may be a switch, toggle, button, or any combination of controls to provide user operation. As a non-limiting example, a user may actuate the artificial muscles 14 and the artificial muscle cantilevers 30 into the actuated state by activating controls of the operating device 304 to a first position. While in the first position, the artificial muscles 14 and the artificial muscle cantilevers 30 will remain in the actuated state. The user may switch the artificial muscles 14 and the artificial muscle cantilevers 30 into the non-actuated state by operating the controls of the operating device 304 out of the first position and into a second position. The operating device 304 may individually operate the artificial muscles 14 and the artificial muscle cantilevers 30 via the first power supply 306 and the second power supply 314, respectively.

The operating device 304 is coupled to the communication path 308 such that the communication path 308 communicatively couples the operating device 304 to other modules of the control system 300. The operating device 304 may provide a user interface for receiving user instructions as to a specific operating configuration of the artificial muscles 14 and the artificial muscle cantilevers 30. In addition, user instructions may include instructions to operate the artificial muscles 14 and the artificial muscle cantilevers 30 only at certain conditions.

The first proximity sensor 320 and the second proximity sensor 321 may be communicatively coupled to the controller 302 over the communication path 308. The first proximity sensor 320 may send signals to the controller 302 indicative of a proximity of an object to the compartment portal 16. The second proximity sensor 321 may send signals to the controller 302 indicative of the object 2 being positioned in the storage compartment 12. The controller 302 may be configured to control actuation of the artificial muscles 14 and/or artificial muscle cantilevers based on the signals received from the first proximity sensor 320 and/or the second proximity sensor 321. When the controller 302 receives a signal from the first proximity sensor 320 indicative of an object in close proximity to the compartment portal 16, the controller 302 may move the artificial muscle cantilevers 30 from the actuated position to the non-actuated position, and may move the artificial muscles 14 from the actuated position to the non-actuated position. When the controller 302 receives a signal from the second proximity sensor 321 indicative of the object 2 being positioned in the storage compartment 12, the controller 302 may move the artificial muscles 14 from the non-actuated position to the actuated position.

The first power supply 306 (e.g., battery) provides power to the artificial muscles 14. The second power supply 314 provides power to the artificial muscle cantilevers 30. In some embodiments, the first power supply 306 and the second power supply 314 are rechargeable direct current power sources. It is to be understood that the first power supply 306 and the second power supply 314 may be a single power supply or battery for providing power to the artificial muscles 14 and the artificial muscle cantilevers 30. A power adapter (not shown) may be provided and electrically coupled via a wiring harness or the like for providing power to the artificial muscles 14 and the artificial muscle cantilevers 30 via the first power supply 306 and the second power supply 314. By providing power to the artificial muscles 14 and the artificial muscle cantilevers 30, the first power supply 306 and the second power supply 314 actuate the artificial muscles 14 and the artificial muscle cantilevers 30 to move from the non-actuated position to the actuated position.

In some embodiments, the control system 300 also includes a display device 316. The display device 316 is coupled to the communication path 308 such that the communication path 308 communicatively couples the display device 316 to other modules of the control system 300. The display device 316 may output a notification in response to an actuation state of the artificial muscles 14 and the artificial muscle cantilevers 30 or indication of a change in the actuation state of the artificial muscles 14 and the artificial muscle cantilevers 30. Moreover, the display device 316 may be a touchscreen that, in addition to providing optical information, detects the presence and location of a tactile input upon a surface of or adjacent to the display device 316. Accordingly, the display device 316 may include the operating device 304 and receive mechanical input directly upon the optical output provided by the display device 316.

In some embodiments, the control system 300 includes network interface hardware 318 for communicatively coupling the control system 300 to a portable device 324 via a network 322. The portable device 324 may include, without limitation, a smartphone, a tablet, a personal media player, or any other electric device that includes wireless communication functionality. It is to be appreciated that, when provided, the portable device 324 may serve to provide user commands to the controller 302, instead of the operating device 304. As such, a user may be able to control or set a program for controlling the artificial muscles 14 and the artificial muscle cantilevers 30 without utilizing the controls of the operating device 304. Thus, the artificial muscles 14 and the artificial muscle cantilevers 30 may be controlled remotely via the portable device 324 wirelessly communicating with the controller 302 via the network 322. The portable device 324 may receive and display the determined electrical resistance or muscle displacement from the controller 302 via the network 322.

From the above, it is to be appreciated that defined herein is a storage compartment assembly including a storage compartment, a plurality of artificial muscles disposed in the storage compartment, and a plurality of artificial muscle cantilevers extending across an opening of the storage compartment. The artificial muscles are configured to actuate to expand in the storage compartment to contact and maintain an object disposed within the storage compartment. The artificial muscle cantilevers are configured to actuate to stiffen across the opening to prevent ingress and egress through the opening.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage compartment assembly comprising:
   a storage compartment comprising at least one inside surface and defining an opening for receiving an object;
   a proximity sensor configured to detect an object within the storage compartment;
   one or more artificial muscles disposed within the storage compartment along the inside surface, each artificial muscle comprising:
      a housing comprising an electrode region and an expandable fluid region;
      a dielectric fluid housed within the housing; and
      an electrode pair positioned in the electrode region of the housing, the electrode pair comprising a first electrode and a second electrode, the electrode pair configured to actuate between a non-actuated position and an actuated position such that actuation from the non-actuated position to the actuated position directs the dielectric fluid into the expandable fluid region to expand the expandable fluid region into the storage compartment; and
   a controller communicatively coupled to the proximity sensor and configured to, in response to receiving a signal from the proximity sensor indicative of the object being within the storage compartment, actuating the one or more artificial muscles to the actuated position.

2. The storage compartment assembly of claim 1, wherein the expandable fluid region of each artificial muscle is configured to contact and deform around the object positioned within the storage compartment to maintain the object within the storage compartment.

3. The storage compartment assembly of claim 1, wherein the at least one inside surface comprises an end surface and one or more sidewalls extending from the end surface, and the one or more artificial muscles comprises a plurality of artificial muscles disposed within the storage compartment along the sidewalls and the end surface.

4. The storage compartment assembly of claim 3, further comprising:
   a compartment portal extending over the opening, the compartment portal comprising a plurality of artificial muscle cantilevers, each artificial muscle cantilever comprising:
      a housing comprising a cantilevered region and an electrode region fluidly coupled to the cantilevered region, the cantilevered region having at least one expandable fluid chamber;
      a first electrode and a second electrode each disposed in the electrode region of the housing; and
      a bladder housing a fluid and extending into the cantilevered region, wherein the cantilevered region of the housing of each of the plurality of artificial muscle cantilevers extends over the opening.

5. The storage compartment assembly of claim 4, wherein the electrode region of each of the plurality of artificial muscle cantilevers is disposed at a periphery of the opening of the storage compartment.

6. The storage compartment assembly of claim 4, wherein the first electrode and the second electrode of the plurality of artificial muscle cantilevers are actuatable between a non-actuated position and an actuated position such that actuation from the non-actuated position to the actuated position directs the fluid in the bladder into the at least one expandable fluid chamber of the cantilevered region, expanding at least one expandable fluid chamber and increasing a stiffness of the cantilevered region of the housing.

7. The storage compartment assembly of claim 4, wherein an adjacent pair of the plurality of artificial muscle cantilevers is coupled together along respective cantilevered regions.

8. The storage compartment assembly of claim 4, wherein:

the plurality of artificial muscle cantilevers comprises a first set of artificial muscle cantilevers having cantilevered regions extending over a first region of the opening and a second set of artificial muscle cantilevers having cantilevered regions extending over a second region of the opening; and ends of the cantilevered regions of the first set of artificial muscle cantilevers face ends of the cantilevered regions of the second set of artificial muscle cantilevers at a location over the opening.

9. The storage compartment assembly of claim 8, wherein contact between the ends of the cantilevered regions of the first set of artificial muscle cantilevers and the ends of the cantilevered regions of the second set of artificial muscle cantilevers defines a central axis extending across the compartment portal, and each of the cantilevered regions of the first set of artificial muscle cantilevers and the cantilevered regions of the second set of artificial muscle cantilevers are angled obliquely from the central axis.

10. The storage compartment assembly of claim 1, wherein the storage compartment extends into one of a dashboard or a panel of a vehicle.

11. A storage compartment assembly comprising:
a storage compartment comprising at least one inside surface and defining an opening for receiving an object; and
a compartment portal extending over the opening, the compartment portal comprising a plurality of artificial muscle cantilevers, each artificial muscle cantilever comprising:
a housing comprising an electrode region fluidly coupled to a cantilevered region, the cantilevered region having at least one expandable fluid chamber;
a first electrode and a second electrode each disposed in the electrode region of the housing; and
a bladder housing a fluid and extending into the cantilevered region, wherein the cantilevered region of the housing of each of the plurality of artificial muscle cantilevers extends over the opening.

12. The storage compartment assembly of claim 11, wherein the first electrode and the second electrode of the plurality of artificial muscle cantilevers are actuatable between a non-actuated position and an actuated position such that actuation from the non-actuated position to the actuated position directs the fluid in the bladder into the at least one expandable fluid chamber of the cantilevered region, expanding at least one expandable fluid chamber and increasing a stiffness of the cantilevered region of the housing.

13. The storage compartment assembly of claim 11, wherein the electrode region of each of the plurality of artificial muscle cantilevers is disposed at a periphery of the opening of the storage compartment.

14. The storage compartment assembly of claim 11, wherein an adjacent pair of the plurality of artificial muscle cantilevers is coupled together along respective cantilevered regions.

15. The storage compartment assembly of claim 11, wherein:
the plurality of artificial muscle cantilevers comprises a first set of artificial muscle cantilevers having cantilevered regions extending over a first region of the opening and a
second set of artificial muscle cantilevers having cantilevered regions extending over a second region of the opening; and
ends of the cantilevered regions of the first set of artificial muscle cantilevers face ends of the cantilevered regions of the second set of artificial muscle cantilevers at a location over the opening.

16. The storage compartment assembly of claim 15, wherein contact between the ends of the cantilevered regions of the first set of artificial muscle cantilevers and the ends of the cantilevered regions of the second set of artificial muscle cantilevers defines a central axis extending across the compartment portal, and each of the cantilevered regions of the first set of artificial muscle cantilevers and the cantilevered regions of the second set of artificial muscle cantilevers are angled obliquely from the central axis.

17. The storage compartment assembly of claim 11, further comprising:
a proximity sensor configured to detect an object within a predetermined proximity of the compartment portal; and
a controller communicatively coupled to the proximity sensor and configured to, in response to receiving a signal from the proximity sensor indicative of the object being within the predetermined proximity of the compartment portal, actuating the plurality of artificial muscle cantilevers to a non-actuated position.

18. A method of operating a storage compartment assembly, the method comprising:
actuating a plurality of artificial muscle cantilevers of a compartment portal, each artificial muscle cantilever comprising:
a housing comprising an electrode region fluidly coupled to a cantilevered region, the cantilevered region having at least one expandable fluid chamber;
a first electrode and a second electrode each disposed in the electrode region of the housing; and
a bladder housing a fluid and extending into the cantilevered region, wherein the cantilevered region of the housing of each of the plurality of artificial muscle cantilevers extends over an opening for receiving an object, the opening defined by a storage compartment,
wherein the first electrode and the second electrode of the plurality of artificial muscle cantilevers are actuatable between a non-actuated position and an actuated position such that actuation from the non-actuated position to the actuated position directs the fluid in the bladder into the at least one expandable fluid chamber of the cantilevered region; and
actuating one or more artificial muscles disposed within the storage compartment, each artificial muscle comprising:
a housing comprising an electrode region and an expandable fluid region;
a dielectric fluid housed within the housing; and
an electrode pair positioned in the electrode region of the housing, the electrode pair comprising a first electrode and a second electrode, the electrode pair configured to actuate between a non-actuated position and an actuated position such that actuation from the non-actuated position to the actuated position directs the dielectric fluid into the expandable fluid region.

19. The method of claim 18, further comprising:
detecting an object within a predetermined proximity of the compartment portal; and
actuating the plurality of artificial muscle cantilevers from the actuated position to the non-actuated position in response to detecting the object within the predetermined proximity of the compartment portal.

20. The method of claim 19, wherein:
actuating the plurality of artificial muscle cantilevers comprises actuating the first electrode and the second electrode of the artificial muscle cantilevers from the non-actuated position to the actuated position.

* * * * *

UNITED STATES PATENT AND TRADEMARK OFFICE
CERTIFICATE OF CORRECTION

PATENT NO. : 12,403,836 B2  
APPLICATION NO. : 17/685927  
DATED : September 2, 2025  
INVENTOR(S) : Michael P. Rowe Page 1 of 1

It is certified that error appears in the above-identified patent and that said Letters Patent is hereby corrected as shown below:

On the Title Page

Item (73), assignee 1, city, delete "Pl.ano" and insert --Plano--, therefor.

In the Specification

In Column 5, Line(s) 24, delete "an" and insert --a--, therefor.

Signed and Sealed this  
Fourteenth Day of October, 2025

John A. Squires  
*Director of the United States Patent and Trademark Office*